Patented Aug. 17, 1926.

1,596,528

UNITED STATES PATENT OFFICE.

IVAN GUBELMANN, OF SOUTH MILWAUKEE, WISCONSIN, ASSIGNOR TO THE NEWPORT COMPANY, OF MILWAUKEE, WISCONSIN, A CORPORATION OF DELAWARE.

ANTHRACENE DYE AND A PROCESS OF MAKING.

No Drawing.   Application filed April 4, 1925. Serial No. 20,627.

This invention relates to coloring matter of the anthracene series and a process of making the same, more particularly to the coloring matters obtained by the condensation of a halogenated pyranthrone body with a nitrogen containing aromatic compound having a reacting hydrogen atom connected to the nitrogen atom. Such an aromatic compound might be a primary or secondary amine in the anthracene, naphthalene or benzene series.

By "pyranthrone" is meant the coloring matter obtained by heating 2.2'-dimenthyl-1.1'-dianthraquinonyl. This coloring matter dyes cotton from a hydrosulfite vat, yielding orange shades on oxidation. It is known in the chemical arts as pyranthrone, and shall hereinafter be referred to by this name.

In the anthracene series such amino containing bodies as 1-amino anthraquinone, 1-amino-2-methylanthraquinone, 1-amino-6-chloranthraquinone, or other homologs or derivatives of alpha amino-anthraquinone may be used. The condensation reaction between a halogenated pyranthrone body and such a primary amino body results in a coloring matter of the general type $NH{-R_1 \atop -R_2}$ in which $R_1$ is the pyranthrone complex and $R_2$ the anthraquinone radical, and in the formation of a halogen acid. The reaction proceeds best in the presence of a high boiling solvent, at temperatures ranging between 150–210° C. Neutralizing agents such as anhydrous sodium acetate, and catalyzers such as basic copper acetate, may be used to facilitate the reaction.

The following examples will serve to illustrate my invention in a preferred form as applied to alpha amino anthraquinone, its homologs and derivatives, but I do not wish to limit the process to these examples:

*Example 1.*—Suspend 50 parts by weight of finely ground dibrom-pyranthrone in 600 parts by weight of dry nitrobenzol, add 25 parts by weight of 1-amino-2-methylanthraquinone, 25 parts by weight of anhydrous sodium acetate in the form of a fine powder, and 10 parts by weight of basic copper acetate as a catalyzer. Heat the mixture under agitation to 200° C. for a period of 10 hours. The color of the mixture changes gradually from red to dark brown. Cool the reaction mass to 60° C. and add 400 parts by weight of denatured alcohol. Stir the mixture for 1 hour and filter off the brown reaction product. Wash the filter cake with denatured alcohol and hot water until the solvent and the inorganic salts have been eliminated. After drying and grinding, the reaction product constitutes a reddish brown powder which, from a hydrosulfite vat, dyes cotton a violet shade which oxidizes to a rich brown shade on exposure to air or other suitable oxidizing agents. The reaction between dibrom-pyranthone and 1-amino-2-methylanthraquinone is probably best represented by the following graphical equation:

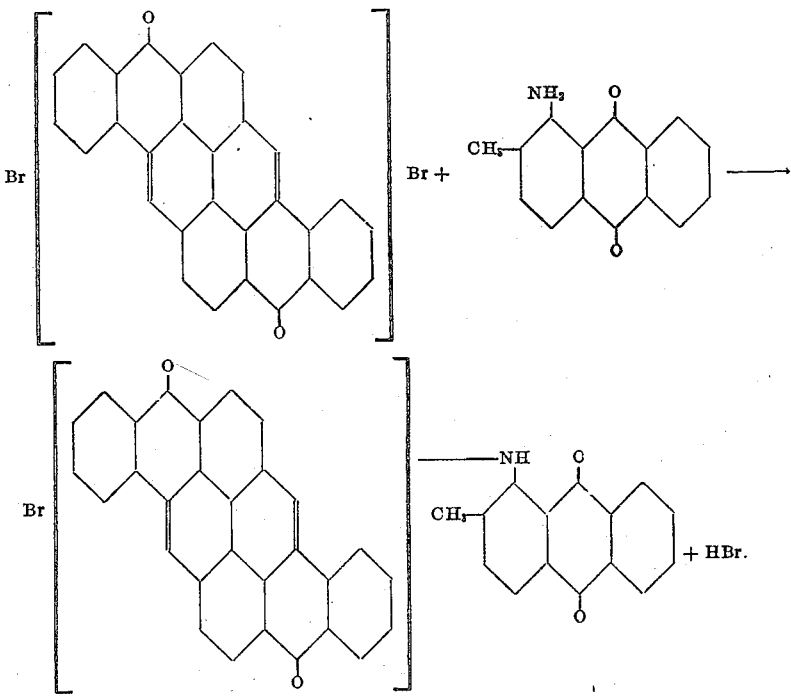

5 The exact position of the bromine atom remaining in the pyranthone radicle and the position of the coupling bond are not known with certainty. Although this is probably the main reaction, it is obvious
10 that the character of the dye may be influenced by unascertained side reactions.

*Example 2.*—Suspend 50 parts by weight of finely ground dibrom-pyranthrone in 600 parts by weight of dry o-nitrotoluol, add 25
15 parts by weight of 1-amino-anthraquinone, 25 parts by weight of anhydrous sodium acetate, in the form of a fine powder, and 5 parts by weight of basic copper acetate as a catalyzer. Heat the mixture under agitation
20 to 190° C. for a period of 20 hours. The color of the mixture changes gradually from red to dark brown. Pour the reaction mass into 500 parts of water containing 25 parts by weight of sodium carbonate. Remove the o-nitrotoluol completely by steam distillation and filter off the remaining brown product. Wash the filter cake thoroughly with hot water to remove inorganic salts. After drying and grinding, the reaction product forms a brown powder which dyes cotton from a hydrosulfite vat a violet shade which oxidizes to a rich brown shade on oxidation with well-known oxidizing agents used in the dyeing of vat dyes. The reaction product of dibrom-pyranthrone and 1-amino-anthraquinone is probably best represented by the following symbol:

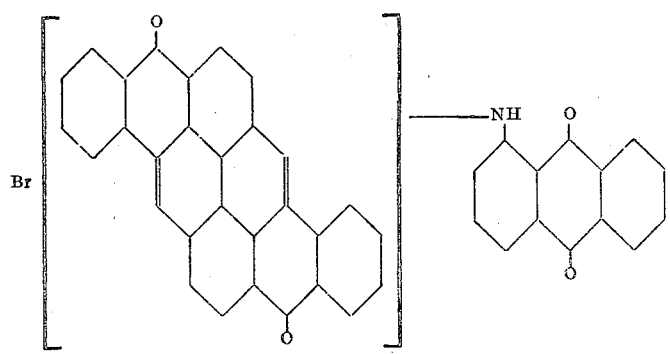

*Example 3.*—Suspend 50 parts by weight of finely ground dibrom-pyranthrone in 600
40 parts by weight of dry o-nitrotoluol and add 30 parts by weight of 1-amino-6-chloranthraquinone, 25 parts by weight of anhydrous sodium acetate in the form of a fine powder, and 5 parts by weight of basic copper acetate as a catalyzer. Heat the mixture under agitation to 210° C. for a period of 6 hours. The color of the mixture changes gradually from red to dark brown. Cool the reaction mass to 60° C. and add 400 parts by weight of denatured alcohol. Stir the mixture for 1 hour and filter off the brown reaction product. Wash the filter cake with denatured alcohol until the o-nitrotoluol has been completely removed and then with water until the cake is free of inorganic salts. After drying and grinding, the reaction product forms a dark brown powder which dyes cotton from a hydrosulfite vat a violet shade which oxidizes to a rich brown shade on exposure to air or other suitable oxidizing agents. The reaction product of dibrom-pyranthrone and 1-amino-6-chloranthraquinone is probably best represented by the following symbol:

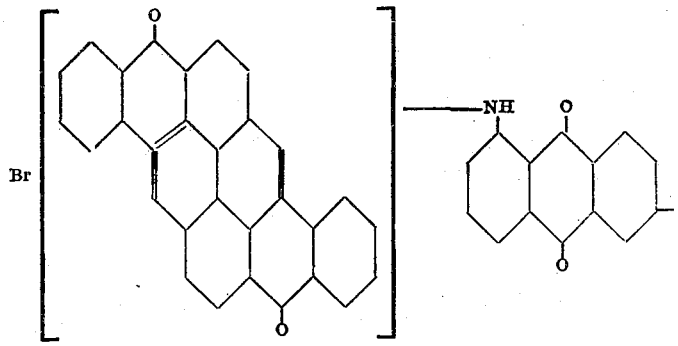

The coloring matters thus obtained are in general brown powders, which, from a purple hydrosulfite vat, dye purple shades on cotton and oxidize to rich brown shades on exposure to air or other oxidizing agents. The shades obtained are extremely fast to washing, light, and other influences. The powders are insoluble in hot and cold water, sparingly soluble in dilute acids and organic solvents, but usually more so in high boiling organic solvents. In concentrated sulfuric acid they dissolve with a blue to purple color, depending on the constituents used, and are again precipitated on dilution with water. They are, however, easily soluble in alkaline hydrosulfite solution.

I am aware that numerous details of the process may be varied through a wide range without departing from the spirit of this invention, and I do not desire limiting the patent granted other than as necessitated by the prior art.

I claim as my invention:

1. The process of producing coloring matters of the anthracene series by heating a halogenated pyranthrone body with an anthraquinone body containing a nitrogen atom having a reacting hydrogen atom attached thereto in the presence of a high boiling solvent and a neutralizing agent.

2. The process of producing coloring matters of the anthracene series by heating a halogenated pyranthrone body with an anthraquinone body containing a nitrogen atom having a reacting hydrogen atom attached thereto in the presence of a high boiling solvent and a neutralizing agent and a catalyzer.

3. The process of producing coloring matters of the anthracene series by heating dibrom-pyranthrone with an alpha amino-anthraquinone body in the presence of a high boiling solvent and a neutralizing agent.

4. The process of producing coloring matters of the anthracene series by heating dibrom-pyranthrone with 1-amino-2-methyl anthraquinone in the presence of a high boiling solvent, anhydrous sodium acetate as a neutralizing agent and a catalyst.

5. As new articles of manufacture, the coloring matters of the anthracene series which are obtained by heating a halogenated pyranthrone body with an anthraquinone derivative containing a nitrogen atom having a reacting hydrogen atom.

6. As new articles of manufacture, the coloring matters of the anthracene series, which are obtained by heating a brom-pyranthrone body with an alpha amino-anthraquinone body.

7. The process of producing a coloring matter of the anthracene series, which includes the condensation of a halogenated pyranthrone body with a nitrogen containing aromatic compound having a reacting hydrogen atom attached to the nitrogen atom, with the formation of a halogen acid.

8. The process of producing coloring matters of the anthracene series, which includes the condensation of a brom-pyranthrone body with a 1-amino-anthraquinone body.

9. The process of producing a coloring matter of the anthracene series, which includes the condensation of a halogenated pyranthrone body with a nitrogen containing aromatic compound having a reacting hydrogen atom attached to the nitrogen atom in the presence of a high boiling solvent, with the formation of a halogen acid.

10. As new articles of manufacture, dyestuffs of the anthracene series having most probably the following general formula:

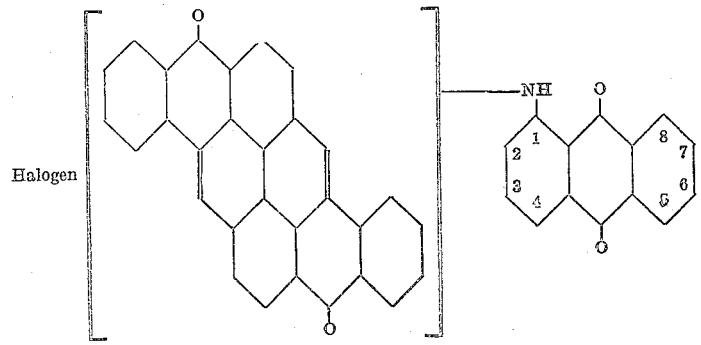

said dyestuffs being in general brown powders, which from a purple hydrosulfite vat, dye purple shades on cotton and oxidize to rich brown shades on exposure to air or other oxidizing agents.

11. Materials dyed with the dye described in claim 10.

12. As new articles of manufacture dyestuffs of the anthracene series having most probably the following formula:

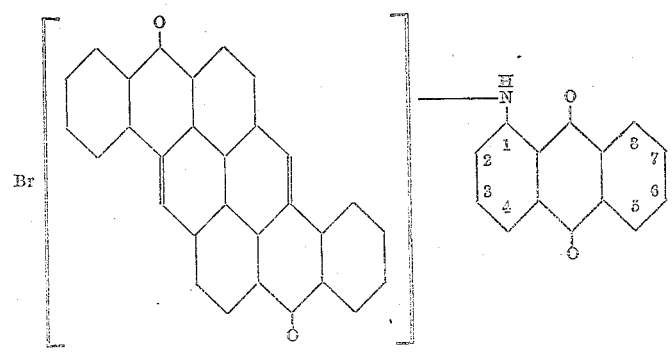

wherein the C atoms in 2, 3, 4, 5, 6, 7 and 8 positions may be substituted by a univalent group, said dyestuffs being in general brown powders, which from a purple hydrosulfite vat dye purple shades on cotton and oxidize to rich brown shades on exposure to the air or other oxidizing agents.

13. Materials dyed with a dyestuff described in claim 12.

In testimony whereof I have hereunto subscribed my name.

IVAN GUBELMANN.